United States Patent
Huang-Fu (10) Patent No.: US 11,134,419 B2
(45) Date of Patent: Sep. 28, 2021

(54) INTERWORKING BETWEEN FIFTH GENERATION SYSTEM (5GS) AND EVOLVED PACKET SYSTEM (EPS) FOR SESSION MANAGEMENT

(71) Applicant: MEDIATEK INC., Hsinchu (TW)

(72) Inventor: Chien-Chun Huang-Fu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/789,861

(22) Filed: Feb. 13, 2020

(65) Prior Publication Data
US 2020/0267606 A1    Aug. 20, 2020

Related U.S. Application Data

(60) Provisional application No. 62/806,928, filed on Feb. 18, 2019, provisional application No. 62/812,449, filed on Mar. 1, 2019, provisional application No. 62/827,910, filed on Apr. 2, 2019.

(51) Int. Cl.
*H04W 36/00*  (2009.01)
*H04W 28/04*  (2009.01)
*H04W 28/02*  (2009.01)

(52) U.S. Cl.
CPC ... *H04W 36/0022* (2013.01); *H04W 28/0257* (2013.01); *H04W 28/0268* (2013.01); *H04W 28/04* (2013.01); *H04W 36/0044* (2013.01)

(58) Field of Classification Search
CPC ......... H04W 28/0257; H04W 28/0263; H04W 28/0268; H04W 28/04; H04W 36/0022; H04W 36/0033; H04W 36/0044
See application file for complete search history.

(56) References Cited

U.S. PATENT DOCUMENTS

2018/0192334 A1    7/2018  Wu
2018/0192455 A1    7/2018  Wu
2019/0313310 A1*  10/2019  Won ................ H04W 36/0033
(Continued)

FOREIGN PATENT DOCUMENTS

WO   WO 2019031941 A1   2/2019

OTHER PUBLICATIONS

International Search Report dated May 20, 2020 in PCT/CN2020/075851, 10 pages.
(Continued)

*Primary Examiner* — Khoa Huynh
(74) *Attorney, Agent, or Firm* — Oblon, McClelland, Maier & Neustadt, L.L.P.

(57) ABSTRACT

Aspects of the disclosure provide a method of checking errors in parameters configured to a user equipment (UE). The method can include receiving at the UE a quality of service (QoS) rule related IE or the QoS flow description related IE for modifying or creating a QoS rule or a QoS flow description associated with an evolved packet system (EPS) bearer context of a packet data network (PDN) connection. The PDN connection can have a default EPS bearer context and optionally a dedicated EPS bearer context. It is determined whether the default EPS bearer context of the PDN connection is associated with a default QoS rule. When it is determined that the default EPS bearer context of the PDN connection is not associated with the default QoS rule, an error handling operation is performed.

20 Claims, 6 Drawing Sheets

(56) References Cited

U.S. PATENT DOCUMENTS

| | | | |
|---|---|---|---|
| 2020/0053592 A1* | 2/2020 | Turtinen | H04W 28/0268 |
| 2020/0100156 A1* | 3/2020 | Liu | H04W 28/0268 |
| 2020/0205226 A1* | 6/2020 | Xiong | H04W 76/10 |
| 2020/0260336 A1* | 8/2020 | Wu | H04W 36/0033 |

OTHER PUBLICATIONS

"Default EPS bearer associates with default QoS rule", MediaTek Inc., 3GPP TSG CT WG1 Meeting #115, C1-191309, Mar. 2019, 9 pages.

"5G QoS—restructuring QoS rules IE", Ericsson, Mediatek Inc., Qualcomm Incorporated, 3GPP TSG-CT WG1 Meeting #111, C1-183815, May 2018, 26 pages.

"Handling of PDU session and QoS flow upon inter-system change", MediaTek Inc., 3GPP TSG-CT WG1 Meeting #109, C1-181332, Mar. 2018, 3 pages.

\* cited by examiner

FIG. 6 ial Application No. 62/806,928, "Enhancement of
INTERWORKING BETWEEN FIFTH GENERATION SYSTEM (5GS) AND EVOLVED PACKET SYSTEM (EPS) FOR SESSION MANAGEMENT

INCORPORATION BY REFERENCE

This present application claims the benefit of U.S. Provisional Application No. 62/806,928, "Enhancement of ESM to 5GSM Interworking" filed on Feb. 18, 2019, No. 62/812,449, "Enhancement of ESM to 5GSM Interwork Verification" filed on Mar. 1, 2019, and No. 62/827,910, "Enhancement of Parameter Handling for ESM 5GSM Interworking" filed on Apr. 2, 2019, which are incorporated herein by reference in their entirety.

TECHNICAL FIELD

The present disclosure relates to wireless communications, and specifically relates to session management during inter-system changes between fifth generation system (5GS) and evolved packet system (EPS).

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Geographical coverage of 5G New Radio (NR) access network connected to a 5G core (5GC) network is limited when 5G system (5GS) is newly introduced. A mobile device moves out of a coverage of the NR access network served by the 5GC network can rely on another radio access technology (e.g., evolved universal terrestrial radio access (E-UTRA)) connected to an evolved packet core (EPC) network in an evolved packet system (EPS). Interworking between the 5GC and the EPC enables a mobile device user to have wide-area mobility while retaining a stable IP address.

SUMMARY

Aspects of the disclosure provide a method of checking errors in parameters configured to a user equipment (UE). The method can include receiving at the UE a quality of service (QoS) rule related information (IE) or the QoS flow description related IE for modifying or creating a QoS rule or a QoS flow description associated with an evolved packet system (EPS) bearer context of a packet data network (PDN) connection. The PDN connection can have a default EPS bearer context and optionally a dedicated EPS bearer context. It is determined whether the default EPS bearer context of the PDN connection is associated with a default QoS rule. When it is determined that the default EPS bearer context of the PDN connection is not associated with the default QoS rule, an error handling operation is performed.

In an embodiment, it is determined whether the default EPS bearer context is not associated with the default QoS rule, or a dedicated EPS bearer context is associated with the default QoS rule. In an embodiment, the determining includes one of determining whether the default EPS bearer context or the dedicated EPS bearer context is associated with a QoS flow.

In an embodiment, the error handling operation includes transmitting a non-access stratum (NAS) message indicating an error cause. In an embodiment, the error handling operation includes deleting the QoS rule associated with the EPS bearer context, or transmitting a message requesting deletion of the QoS rule associated with the EPS bearer context.

In an embodiment, in response to receiving the QoS rule related IE or the QoS flow description related IE, it is determined whether the default EPS bearer context of the PDN connection is associated with the default QoS rule. In an embodiment, in response to detecting that an inter-system change from an EPS to a fifth generation system 5GS takes place, it is determined whether the default EPS bearer context of the PDN connection is associated with the default QoS rule. In an embodiment, the PDN connection is released. A transfer of the PDN connection from the EPS to the 5GS can be skipped, or the PDN connection can be transferred from the EPS to the 5GS.

Aspects of the disclosure provide an apparatus including circuitry. The circuitry can be configured to receive a QoS rule related IE or the QoS flow description related IE for modifying or creating a QoS rule or a QoS flow description associated with an EPS bearer context of a PDN connection having a default EPS bearer context and optionally a dedicated EPS bearer context. It is determined whether the default EPS bearer context of the PDN connection is associated with a default QoS rule. When it is determined that the default EPS bearer context of the PDN connection is not associated with the default QoS rule, an error handling operation can be performed.

Aspects of the disclosure provide a non-transitory computer-readable medium storing instructions that, when executed by a processor, cause the processor to perform the method of checking errors in parameters configured to a UE.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
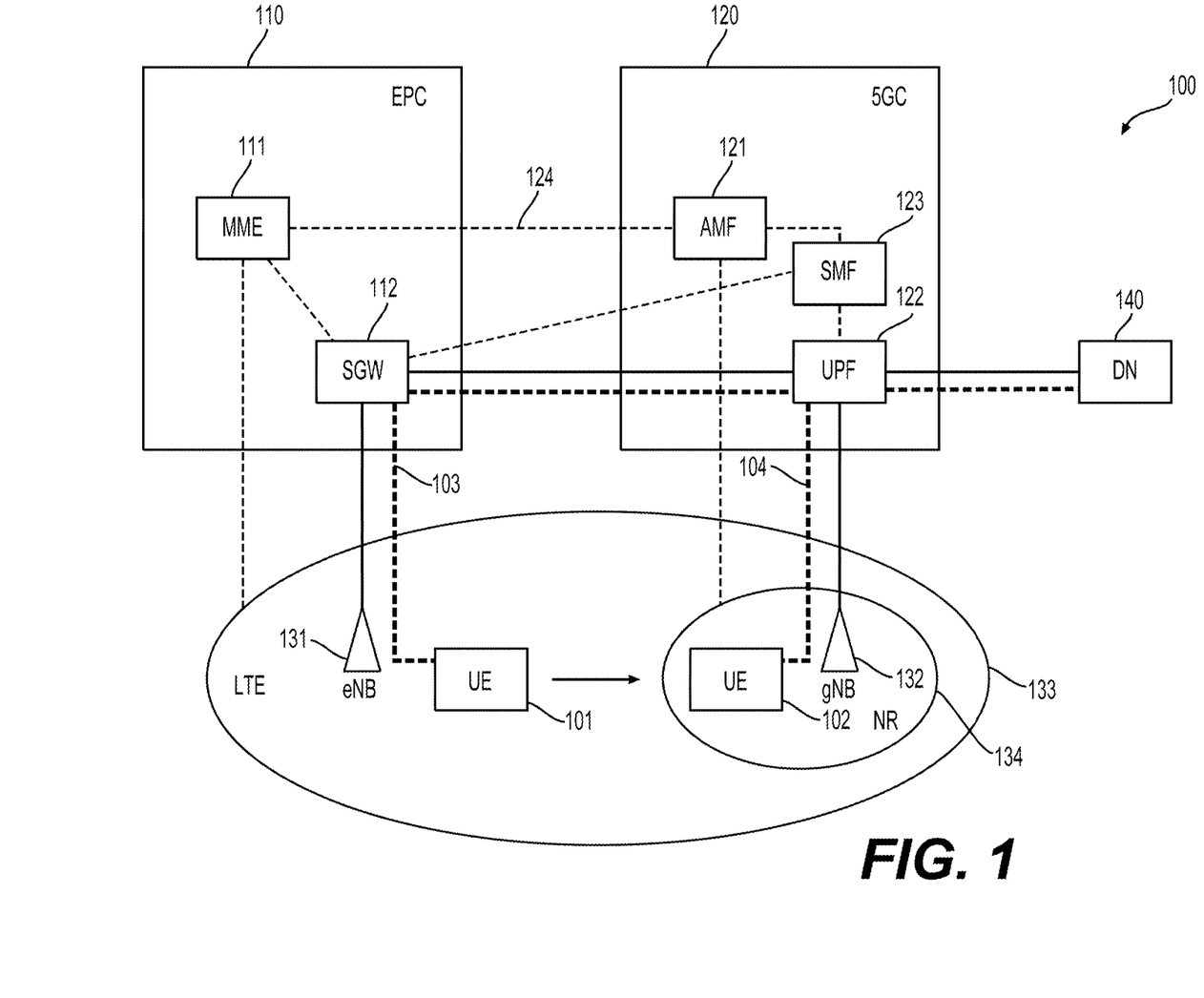
FIG. 1 shows a wireless communication system 100 according to an embodiment of the disclosure.

FIG. 1 shows a wireless communication system 100 according to an embodiment of the disclosure. The system 100 includes an evolved packet core (EPC) 110 and a fifth generation core (5GC) 120 that interwork with each other. The EPC 110 is connected to a first base station 131 implementing Long Term Evolution (LTE) radio access technology. For example, the first base station 131 can be an eNB 131 implementing the evolved universal terrestrial radio access (E-UTRA) air interface as specified in the 3rd Generation Partnership Project (3GPP) LTE standards. The 5GC 120 is connected to a second based station 132 implementing fifth generation (5G) New Radio (NR) access technology or other non-3GPP access technology. For example, the second base station 132 can be a gNB 132 implementing the NR air interface as specified in the 3GPP NR standards. The eNB 131 can have a coverage 133 overlapping a coverage 134 of the gNB 132. The EPC 110 and the eNB 131 form a 5G system (5GS) while the 5GC 120 and the gNB 132 form an evolved packet system (EPS).

The EPC 110 can include a mobility management entity (MME) 111, and a serving gateway (SGW) 112. The MME 111 can be configured to perform bearer activation/deactivation operations, and terminate non-access stratum (NAS) signaling from a user equipment (UE) served by the eNB 131. The SGW 112 can be configured to route and forward user data packets to and from UEs served by the eNB 131. In coordination with the MME 111, the SGW 112 can serve as a mobility anchor for user plane during inter-eNB handovers.

The 5GC 120 can include an access and mobility management function (AMF) 121, a user plane function (UPF) 122, and a session management function (SMF) 123. The AMF 121 communicates with UEs served by the gNB 132 using 5GC NAS protocol. For example, different from the MME 111, the AMF 121 does not handle session management. Instead, the AMF 121 forwards session management related signaling messages between UEs served by the gNB 132 and the SMF 123. In addition, the AMF 121 can exchange UE contexts (e.g., session contexts) with the MME 111 via an interface 124 (e.g., N26 interface specified in 3GPP standards).

The SMF 123 is configured to manage UE sessions passing through the UPF 122. For example, the SMF 123 can be configured to perform functions of establishment, modification, and release of individual sessions, and allocation of IP addresses per session. The sessions managed by the SMF 123 can be sessions between the UPF 122 and UEs served by the gNB 132, or can be sessions between the UPF 122 and UEs served by the eNB 131 via the SGW 112. For example, the SMF 123 and the UPF 122 can implement packet data network (PDN) gateway (PGW) control plane function (PGW-C) and PGW user plane function (PGW-U), respectively, to enable sessions being established between the SGW 112 and the UPF 122.

The UPF 122 is configured to process and forward user data under the control of the SMF 123. For example, the UPF 122 can serve as an anchor point for connecting UEs served by the system 100 towards an external data network (DN) 140 (e.g., the Internet). IP packets with an IP address belonging to a specific UE served by the UPF 122 can be routable from the DN 140 to the UPF 122 while the specific UE is moving around within coverage of the system 100.

In an example, a UE 101 out of the coverage 134 but within the coverage 133 is served by the EPC 110. The UE 101 can be a mobile phone, a laptop, a vehicle, and the like. The UE 101 is capable of operating in EPC NAS mode or 5GC NAS mode. At current location shown in FIG. 1, the UE 101 can be connected to the EPC 110, and operate in EPC NAS mode. For example, data can be transmitted between the UE 101 and the SGW 112 via an S1-U interface, while NAS messages for control signaling can be transmitted between the UE 101 and the MME 111 via an S1-MME interface. Thus, the EPC NAS mode is also referred to as S1 mode. A session 103 (referred to as a PDN connection 103, or EPS session 103) can be established between the UE 101 and the UPF 122 via the SGW 112.

As shown, the UE 101 can move from the eNB 131 to the gNB 132, and enters the coverage 134 of the gNB 132. The UE 101 at the new location within the coverage 134 is shown as UE 102. During the moving, triggered by a configuration at the UE 101, the UE 101 can perform a handover procedure to switch from the EPS to the 5GS. During the handover procedure, the PDN connection 103 of UE 101 can be switched to a new session 104 (referred to as a protocol data unit (PDU) session 104) established between the UE 102 and the UPF 122. As the UPF 122 serves as an anchor point connecting the DN 140, the PDN connection 103 can be maintained while being switched to the PDU session 104 without changing an IP address assigned for the UE 101 (or 102).

The UE 102 is served by the 5GC 120, and operates in 5GC NAS mode. For example, data can be transmitted between the UE 102 and the UPF 122, while NAS messages for control signaling can be transmitted between the UE 102 and the AMF 121 via an N1 interface. Thus, the 5GC NAS mode is also referred to as N1 mode.

The 5GC 120 and the EPC 110 can interwork with each other to facilitate the above inter-system change of the UE 101 from S1 mode to N1 mode. For example, during the handover procedure, a session context and associated information of the PDN connection 103 can be provided from the MME 111 to the AMF 121. This session context and the associated information may include information, for example, indicating how EPS bears of the PDN connection 103 are mapped to quality of service (QoS) flows of the PDU session 104. The AMF 121 may pass the session context and/or the associated information to the SMF 123. The SMF 123 can accordingly configured the UPF 122 and the gNB 132 to establish the PDU session 104 between the UPF 122 and the gNB 132.

At the UE 101, before the inter-system change from S1 mode to N1 mode takes place, the MME 111 may configure 5G session parameters (including 5G QoS flow parameters) to the UE 101. For example, the PDN connection 103 and the PDU session 104 may have different structures. The PDN connection 103 can include EPS bears each associated with QoS parameters and traffic flow templates (TFTs) (including packet filters) defining the respective EPS bearers, while the PDU session 104 can include QoS flows each associated with QoS rules and QoS flow description defining the respective QoS flows. Accordingly, the 5GS session parameters can indicate to the UE 101 how the EPS bearers are mapped to the QoS flows by providing the mapping relationship between the EPS bearers and the QoS flows as well as suitable QoS related information for defining the QoS flows. Based on the received 5G session parameters (that are associated with the respective EPS bearers), upon the inter-system change from S1 mode to N1 mode, the UE 101 can transfer the PDN connection 103 to the PDU session 104.

At the UE 102, after the inter-system change from S1 mode to N1 mode, the UE 102 may store EPS session parameters (including EPS bearer contexts) associated with the PDN connection 103 to prepare for possible inter-system change from N1 mode to S1 mode. For example, the stored EPS session parameters can include QoS parameters and TFTs associated with the respective EPS bearers as well as mapping relationship between the QoS flows in the PDU session 104 and respective EPS bearers in a PDN connection. Upon the UE 102 moving away from the gNB 132 and re-entering the coverage 133 of the eNB 131, based on the stored EPS session parameters, the UE 102 can map the QoS flows of the PDU session 104 to respective EPS bearers of the PDN connection.

In addition, upon the inter-system change from N1 mode to S1 mode, the AMF 121 can provide a session context (e.g., including associated EPS bearer context parameters and/or mapping relationship between QoS flows and EPS bearers) corresponding to the PDU session 104 to the MME 111, and the PGW-C in the SMF 123, and the PGW-U in the UPF 122. The MME 111 may pass the session context to the SGW 112. The SGW 112, the PFW-C in the SMF 123, and the PGW-U in the UPF 122 may coordinate to establish a PDN connection between the eNB 131 and the UPF 122.

Figure 2:
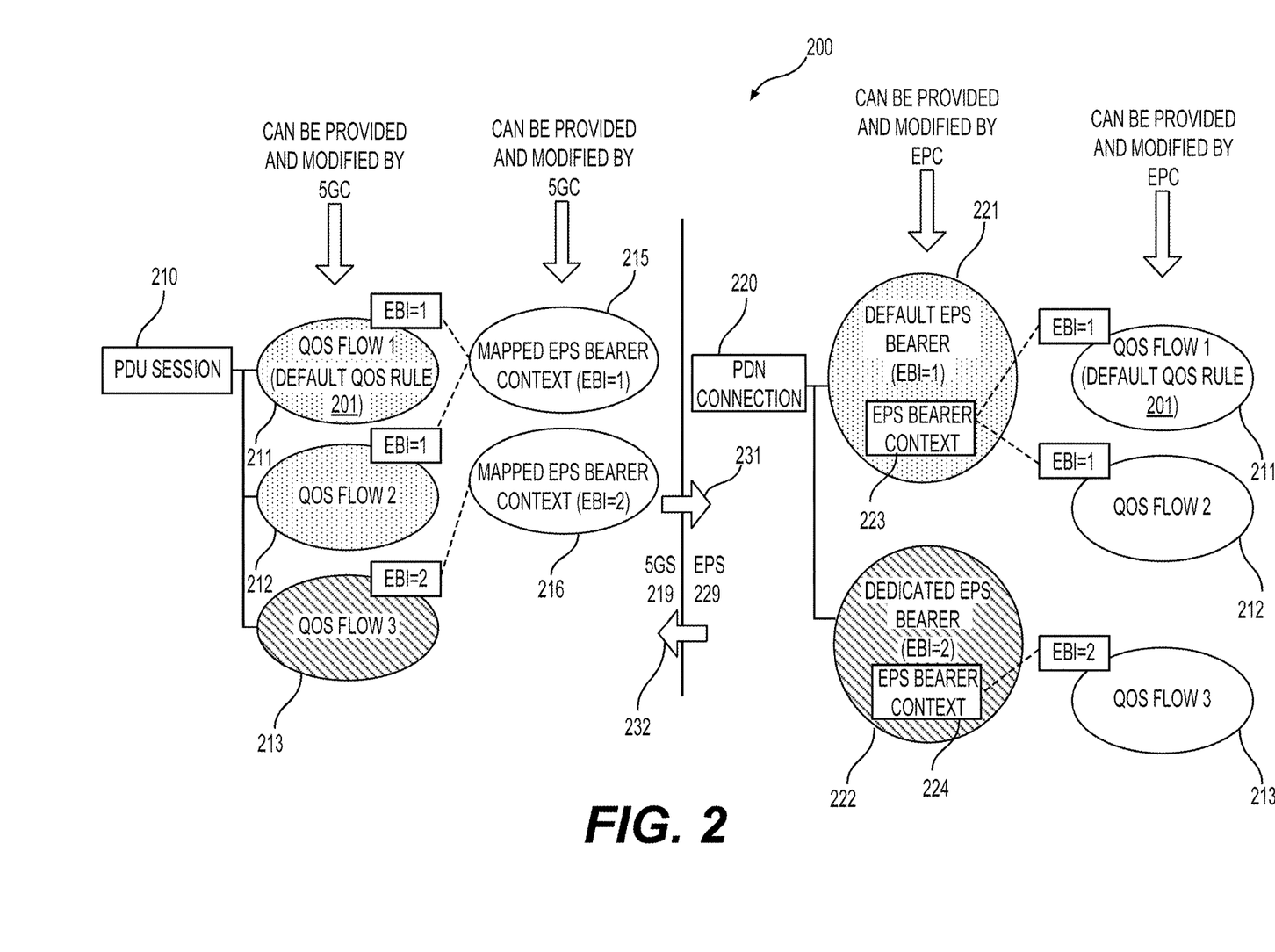
FIG. 2 shows an example of a mapping relationship 200 between a protocol data unit (PDU) session 210 in a fifth generation system (5GS) 219 and a packet data network (PDN) connection 220 in an evolved packet system (EPS) 229 when inter-system change between N1 mode and S1 mode takes place.

FIG. 2 shows an example of a mapping relationship 200 between a PDU session 210 in a 5GS 219 and a PDN connection 220 in an EPS 229 when inter-system change between N1 mode and S1 mode takes place. The UE 101 (or 102) and the system 100 is used as examples for explanation of FIG. 2.

The PDU session 210 can be established and maintained between the UE 102 and the UPF 122 in FIG. 1. The PDU session 210 includes three QoS flows 211-213. Each QoS flow 211-213 can be characterized by one or more QoS rules. Each QoS rule includes traffic filters associating PDUs to the respective QoS flow. The QoS flow 211 can be associated with a default QoS rule 201 that includes a traffic filter set allowing all uplink packets to pass through. The default QoS rule 201 can be used in case there is no other QoS rule with a packet filter set matching the uplink data packets. The QoS flow 211 is associated with the default QoS rule, and thus is referred to as a default QoS flow, while the QoS flows 212-213 are not associated with a default QoS rule, and thus are referred to as non-default QoS flows.

Each QoS flow 211-213 can further be characterized by a QoS flow description including QoS related parameters corresponding to the respective QoS flow. Optionally, the QoS flow description can include an EPS bearer identity (EBI) for use in inter-system change of the UE 102 from N1 mode to S1 mode. As shown, the QoS flows 211-213 can be associated with EBIs having values of 1, 1, and 2, respectively. Each EBI can be used as an index to associate the respective QoS flow 211-213 to a mapped EPS bearer context 215 or 216.

For example, the default QoS flow 211 and the non-default QoS flow 212 both have a EBI=1, and accordingly are associated to the mapped EPS bearer context 215 having an EBI=1. Similarly, the non-default QoS flow 213 having EBI=2 is associated to the mapped EPS bearer context 216 having EBI=2.

The mapped EPS bearer contexts 215-216 each provide information of an EPS bearer that would be mapped with the corresponding QoS flow(s) when an inter-system change from N1 mode to S1 mode takes place. For example, in addition to the EBI=1, the mapped EPS bearer context 215 can include TFTs and QoS parameters characterizing the respective EPS bearer (EBI=1) to be mapped to the QoS flows 211-212. Similarly, the mapped EPS bearer context 216 can include TFTs and QoS parameters characterizing the respective EPS bearer (EBI=2) to be mapped to the QoS flows 213.

The QoS flows 211-213 can be provided (established) by the 5GC 120. For example, parameters characterizing the QoS flows 211-213 can be provided to the UE 102 while the PDU session 210 is created. During the establishment of the PDU session 210 or the QoS flows 211-213, the mapped EPS bearer contexts 215-216 can also be provided from the 5GC 120, for example, through NAS signaling.

Alternatively, the QoS flows 211-213 and the respective mapped EPS bearer contexts 215-216 can be established at the UE 102 upon inter-system change of the UE 101 from S1 mode to N1 mode. For example, the EPS bearers of EBI=1 and EBI=2 can previously exit when the UE 101 is in S1 mode. Upon the inter-system change from S1 mode to N1 mode, the previous EPS bearers can be mapped to the QoS flows 211-213. Parameters of the previous EPS bearers of EBI=1 and EBI=2 (e.g., TFTs, and associated QoS parameters) can be stored at the UE 102. An association between each of the QoS flows 211-213 and the respective previous EPS bearer can be stored. Thus, instead of using the mapped EPS bearer contexts 215 and 216, the stored associations between the QoS flows and the mapped EPS bearers can be used to fetch information similar to that in the mapped EPS bear contexts 215-216.

Accordingly, in this detailed description, mapped EPS bearer contexts, or parameters or information in the mapped EPS bearer contexts may also be used to refer to parameters or information obtained from the associations between QoS flows and mapped EPS bearers when describing session switches during inter-system changes between N1 mode and S1 mode.

While the PDU session 210 being maintained before an inter-system change from N1 mode to S1 mode takes place, the PDU session 210 may be modified (either initiated by the UE 102 or the 5GC 120). For example, new QoS flows may be added, or existing QoS flows may be removed or modified (e.g., QoS rules of an existing QoS flow may be changed, or removed, or a new QoS rule may be added; a QoS flow description of an existing QoS flow may be replaced, or modified). Under such scenarios, the mapped EPS bear contexts 215-216 can also be modified to adapt the to-be-mapped EPS bearers to match the status of the modified PDU session 210. For example, through NAS signaling, new mapped EPS bearer context may be provided, and existing mapped EPS bearer context may be modified or removed.

The right side of the FIG. 2 shows the PDN connection 220 in the EPS 229. The PDN connection 220 can be established and maintained between the UE 101 and the UPF 122 via the SGW 112 in FIG. 1. The PDN connection 220 can include a default EPS bearer 221 with EBI=1 and a dedicated EPS bearer 222 with EBI=2. Each EPS bearer 221-222 can be characterized by one or more TFTs and a set of QoS parameters. The default EPS bearer 221 can be the first EPS bearer activated when the PDN connection 220 is created, and can stay activated until the PDN connection 220 is terminated even no data is transmitted. The default bearer 221 can typically be set as a non-guaranteed bit rate (non-GBR) type. In contrast, the dedicated EPS bearer 222 can typically be an additional EPS bearer activated on demand after the PDN connection 220 is established. The dedicated EPS bearer 222 can be of a GBR or non-GBR type.

In addition, the default EPS bearer 221 can include none of TFTs, and packets not filtered into the dedicated EPS bearer 222 (or other dedicated EPS bearer, if activated) may be carried in the default bearer 221. In contrast, the dedicated EPS bearer 222 typically includes at least one TFT providing filters for filtering packets that may need QoS treatment different from that of the default EPS bearer 221.

The default EPS bearer 221 of EBI=1 can be associated with an EPS bearer context 223. The EPS bearer context 223 may include QoS related parameters (e.g., QoS parameters, TFTs, or the like) associated with the default EPS bearer 221, and/or parameters associated with the PDN connection 220. As an EPS bearer is a logical session defined by QoS parameters included in an associated EPS bearer context at the UE 101, "an EPS bearer context" can be used to refer to "an EPS bearer" in this detailed description, and in some places, the "EPS bearer" and "EPS bearer context" are used interchangeably.

In addition, the EPS bearer context 223 may be associated with parameters or information of QoS flows which the default EPS bearer 221 would be mapped to when inter-system change from S1 mode to N1 mode takes place. In another example, parameters or information of QoS flows which the default EPS bearer 221 would be mapped to can be included in the EPS bearer context 223 (i.e., the QoS flow description).

For example, as shown in FIG. 2, the default EPS bearer 221 is to be mapped to the QoS flows 211-212 in case an inter-system change of the UE 101 from S1 mode to N1 mode takes place. Corresponding to this configuration, the EPS bearer context 223 can be associated with QoS flow descriptions and/or QoS rules defining the QoS follows 211 and 212.

The dedicated EPS bearer 222 of EBI=2 can be associated with an EPS bearer context 224. The dedicated EPS bearer 222 is to be mapped to the QoS flow 213. Accordingly, corresponding to this configuration, the EPS bearer context 224 can be associated with the QoS flow description and QoS rules corresponding to the QoS follow 213.

The default EPS bearer 221 and the dedicated EPS bearer 222 can be provided by the EPC 110. For example, parameters characterizing the EPS bearer 221 can be provided to the UE 101 when the PDN connection 220 is created, and parameters characterizing EPS bearer 222 can subsequently be added. For example, during the establishment of the PDN connection 220, the EPS bearer contexts 223-224 can be provided from the EPC 110, for example, through NAS signaling.

Alternatively, the EPS bearers 221-222 and the respective associated EPS bearer contexts 223-224 can be established at the UE 101 upon inter-system change of the UE 101 from N1 mode to S1 mode. For example, the QoS flows 211-213 exist previously when the UE 102 is in N1 mode. Upon inter-system change from N1 mode to S1 mode, the previous QoS flows 211-213 can be mapped to the EPS bears 221-222 based on the indication of the mapped EPS bearer contexts 215-216. Parameters of the previous QoS flows 211-213 (e.g., QoS rules and QoS flow descriptions) can be stored at the UE 101. For example, the parameters of the previous QoS flows 211-212 can be associated with the EPS bearer context 223, while the parameters of the previous QoS flow 213 can be associated with the EPS bearer context 224.

Similarly, while the PDN connection 220 being maintained before an inter-system change from S1 mode to N1 mode takes place, the PDN connection 220 can be modified. For example, new EPS bearers can be created, or existing EPS bearers can be modified or removed. Accordingly, the corresponding QoS flow descriptions/QoS rules parameters associated with the EPS bearer context 223-224 can also be modified to adjust the to-be-mapped QoS flows to match the updated status of the modified PDN connection 220.

For example, through NAS signaling, the UE 101 can receive new QoS rule(s) and/or QoS flow description(s) or indications of how to modify existing QoS rules and/or QoS flow descriptions carried in NAS messages. For example, a protocol configuration options (PCO) IE or an extended PCO IE can be received in a modify EPS bearer context request message. For example, the PCO IE or the extended PCO IE can carry one or more QoS rule parameters. Each QoS rule parameter can indicate how to create a new QoS rule or modifying (including deleting and changing) an existing QoS rule. Or, the PCO IE or the extended PCO IE can carry one or more QoS flow description parameters. Each QoS flow description parameter can indicate how to create or modify a QoS flow description. Each QoS flow description parameter can indicate an EBI that associates the respective QoS flow description (and respective QoS rules) to the target EPS bearer context. Based on the IE in the NAS message for creating or modifying respective QoS rules or QoS flow descriptions, the QoS rule(s) and QoS flow(s) associated with the EPS bearer contexts 223-224 can be modified, or replaced.

As examples, two processes 231 and 232 of session switches between the PDU session 210 and the PDN connection 220 are described below.

Upon inter-system change of the UE 102 from N1 mode to S1 mode takes place, the first session switch process 231 can be performed to switch the PDU session 210 in the 5GS 219 to the PDN connection 220 in the EPS 229. The UE 102 can create the default EPS bearer context 223, and the dedicated EPS bearer context 224 based on the parameters of the mapped EPS bearer contexts 215-216, or the associations between QoS flow and to be mapped EPS bearer if available. The EBI=1 assigned for the default QoS flow 221 (with the default QoS rule 201) becomes the EBI=1 of the default EPS bearer 221. Or, in other words, the default QoS flow 221 is mapped to the default EPS bearer 221. The EBIs (EBI=1, and EBI=2), the QoS parameters, and the TFTs in the mapped EPS bearer contexts 215-216 are used for creating the EPS bearers 221-222, respectively.

In an example, when there is no EBI assigned to the default QoS flow 221, the UE 102 may perform a local release of the PDU session 210. When there is not EBI assigned to the non-default QoS flows 212-213, the UE 102 can locally delete the QoS rules and QoS flow descriptions of the respective non-default QoS flows.

In addition, at the end of the first session switch process 231, the UE 101 can associate an identity of the PDU session 210 with the default EPS bearer context 223, and associate the QoS rules and QoS flow descriptions of the QoS flows 211-213 with the respective EPS bearer contexts 223-224.

Upon inter-system change of the UE 101 from S1 mode to N1 mode takes place, the second session switch process 232 can be performed to switch the PDN connection 220 in the EPS 229 to the PDU session 210 in the 5GS 219. The UE 101 can use the parameters in the EPS bearer contexts 223-224 or QoS rule(s)/QoS flow description(s) associated with the EPS bearer contexts 223-224 to create the PDU session 210. For example, a PDU session identity associated with the default EPS bearer context 223 can be used as that of the PDU session 210. The QoS rules and QoS flow descriptions corresponding to the QoS flows 211-213 associated with the EPS bearer contexts 223-224 can be used to create QoS rules and QoS flow contexts of respective QoS flows 211-213 in the PDU session 210. In addition, at the end of the second session switch process 232, the UE 102 can associate the EBIs, the QoS parameters, and the TFTs of the EPS bearers 221-222 with the respective QoS flows 221-223 in the PDU session 210.

Figure 3A:
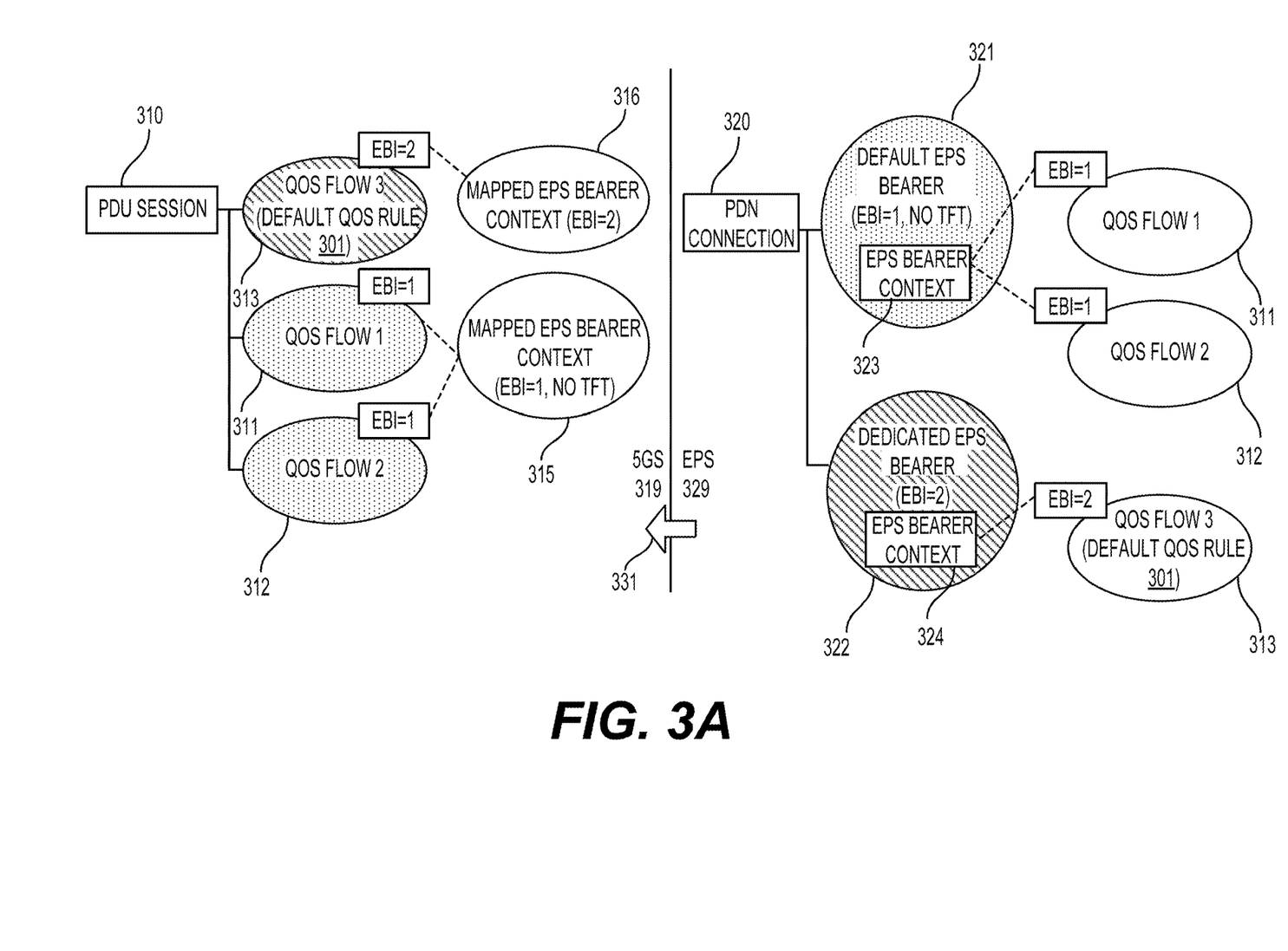
FIGS. 3A-3B show an example of inter-system changes with 5GS quality of service (QoS) flow parameters being incorrectly assigned to a PDN connection 320 in an EPS 329.
Figure 3B:
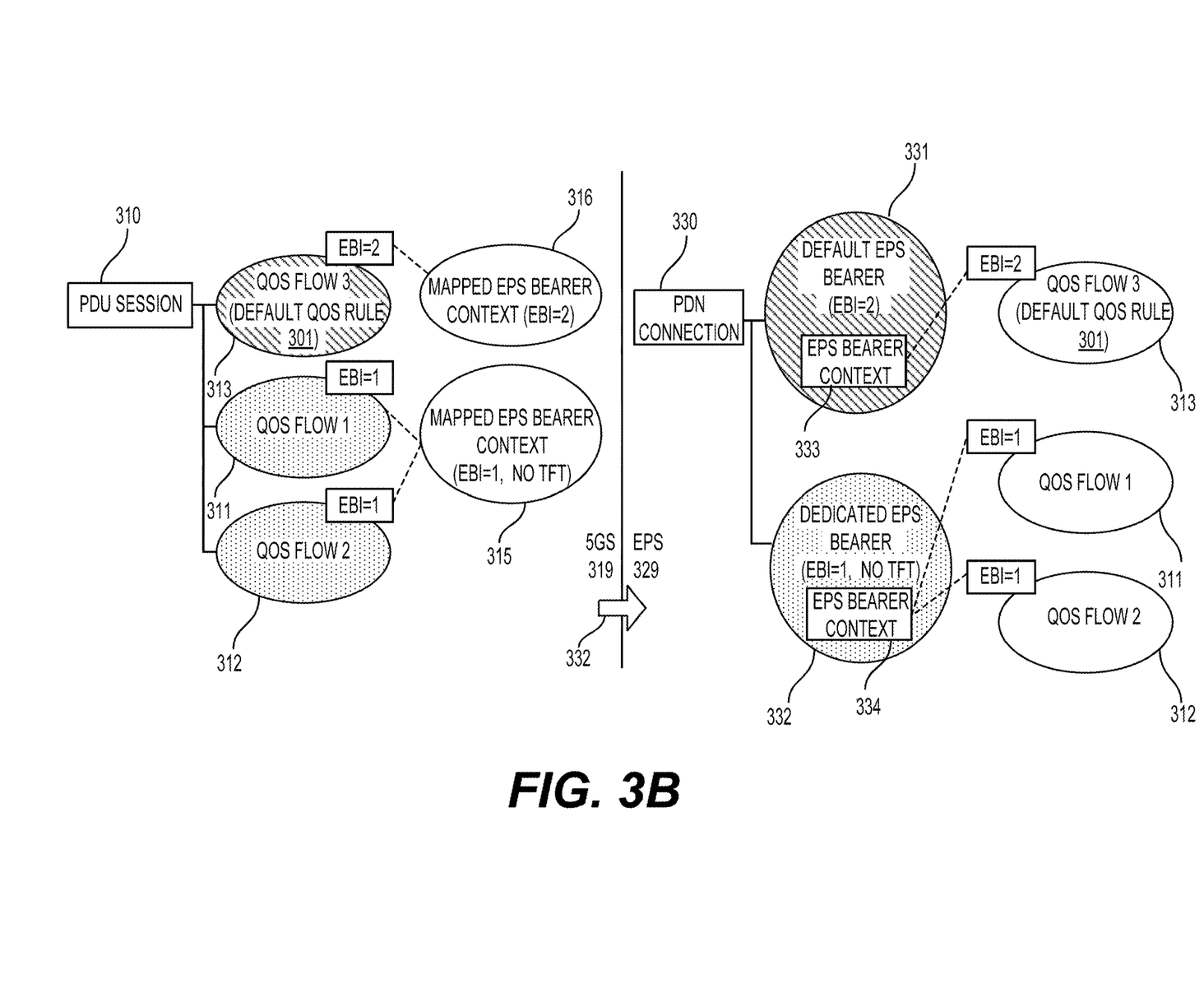

FIGS. 3A-3B show an example of inter-system changes with 5GS QoS flow parameters being incorrectly assigned to a PDN connection 320 in an EPS 329. At the right sided of FIG. 3A, similar to the PDN connection 220 in FIG. 2, the PDN connection 320 includes a default EPS bearer 321 with EBI=1, and a dedicate EPS bearer 322 with EBI=2. The default EPS bearer 321 has no TFT configured, and can allow packets not admitted by other EPS bearers to be carried in the default EPS bearer 321. In addition, for purpose of preparation for possible inter-system change of the UE 101 from S1 mode to N1 mode, the default EPS bearer 321 and the dedicated EPS bearer 322 are associated with QoS flow parameters associated with a first EPS bearer context 323, and a second EPS bearer context 324, respectively. The QoS parameters (e.g., QoS rules, and/or QoS flow descriptions) associated with the EPS bearer context 323-324 define QoS flows 311-313.

However, incorrect associations are provided between the QoS flow parameters (or QoS flows) and the EPS bearer contexts 323-324 (or the respective EPS bearers 321-322). As shown, the QoS flow 313 has a default QoS rule 301 that may allow packets not accepted by other QoS flows entering the QoS flow 313. Thus, the QoS flow 313 is a default QoS flow that can typically be treated with a QoS level of best efforts. The default QoS flow 313 is accidentally associated to the dedicated EPS bearer 322 that typically is configured with specific packet filters to filtering out packets to be treated in a particular way (e.g., processed to satisfy a specific QoS level). This error would take place when the 5G QoS flow parameters defining the QoS flow 313 are incorrectly associated with the EPS bearer context 324 and thus associated with the dedicated EPS bearer 322.

Accompanying the default QoS flow 313 being assigned to the dedicated EPS bearer 322, the non-default QoS flows 311-312 are assigned to the default EPS bearer 321 with no TFT (no packet filters) configured. Or, in other words, the EPS bearer context 323 corresponding to the default EPS bearer 321 is associated with the 5GS QoS flow parameters defining the QoS flows 311-312. As a result, no default QoS flow is associated to the default EPS bearer 323. This incorrect association (no default QoS flow is associated to a default EPS bearer) later causes an incorrect status where a dedicated EPS bearer with no TFT is created after an inter-system change of the UE 101 from S1 mode to N1 mode (FIG. 3A) followed by switching back from N1 mode to S1 mode (FIG. 3B).

In FIG. 3A, an inter-system change 331 of the UE 101 from S1 mode in EPS 329 to N1 mode in a 5GS 319 takes place. The PDN connection 320 is switched to a PDU session 310 under the guidance of the EPS bearer contexts 323-324 and the associated 5G QoS parameters. The default EPS bearer 321 is mapped to the non-default QoS flow 311-312 in the PDU session 310 as indicated by the EPS bearer context 323, and a mapped EPS bearer context 315 can subsequently be created. The mapped EPS bearer context 315 can include QoS parameters of the default EPS bearer 321 but with no TFT indicated. The dedicated EPS bearer 322 is mapped to the default QoS flow 313 in the PDU session 310 as indicated by the EPS bearer context 324, and a mapped EPS bearer context 316 is created. The mapped EPS bearer context 316 include QoS parameters and TFTs of the dedicated EPS bearer 322.

In FIG. 3B, another inter-system change 332 of the UE 102 from N1 mode in 5GS 319 to S1 mode in EPS 329 takes place. The PDU session 310 is switched to a PDN connection 330 under the guidance of parameters in the mapped EPS bearer context 316-315. The default QoS flow 313 is mapped to a EPS bearer 331 in the PDN connection 330, and the QoS parameters and TFTs in the mapped EPS bearer context 316 is used to create the EPS bearer 331. In an embodiment, a session transfer rule is followed when performing inter-system change from N1 mode to S1 mode that an EPS bearer mapped from the default QoS flow (i.e., the QoS flow of the default QoS rule) is treated as the default EPS bearer. Accordingly, the EPS bearer 331 has the property of a default EPS bearer and is treated as a default EPS bearer. For example, the default EPS bearer 331 can last until the PDN connection 330 is deactivated, and is typically used for carrying packets requiring best efforts service. Upon the creation of the default EPS bearer 331, an EPS bearer context 333 can be created that is associated with the parameters related with the default QoS flow 313 in the PDU session 310.

Still in FIG. 3B, the other non-default QoS flows 311-312 are mapped to an EPS bearer 332 as indicated by the mapped EPS bearer 315. Because no TFT is indicated in the mapped EPS bearer 315, the EPS bearer 332 has no TFT being configured. However, according to the session transfer rule, because the EPS bearer 332 is mapped from the non-default QoS flows 311-312, the EPS bearer 332 is treated as a dedicated EPS bearer. Thus, the inter-system change 332 results in the dedicated EPS bearer 332 being created without a valid TFT. Such dedicated EPS bearer 332 would allow all packets to be accepted and treated according to the QoS parameters specified for the dedicated EPS bearer 332, which is not allowed. Upon the creation of the dedicated EPS bearer 332, an EPS bearer context 334 can be created that is associated with parameters related with the QoS flows 311-312 in the PDU session 310.

Figure 4:
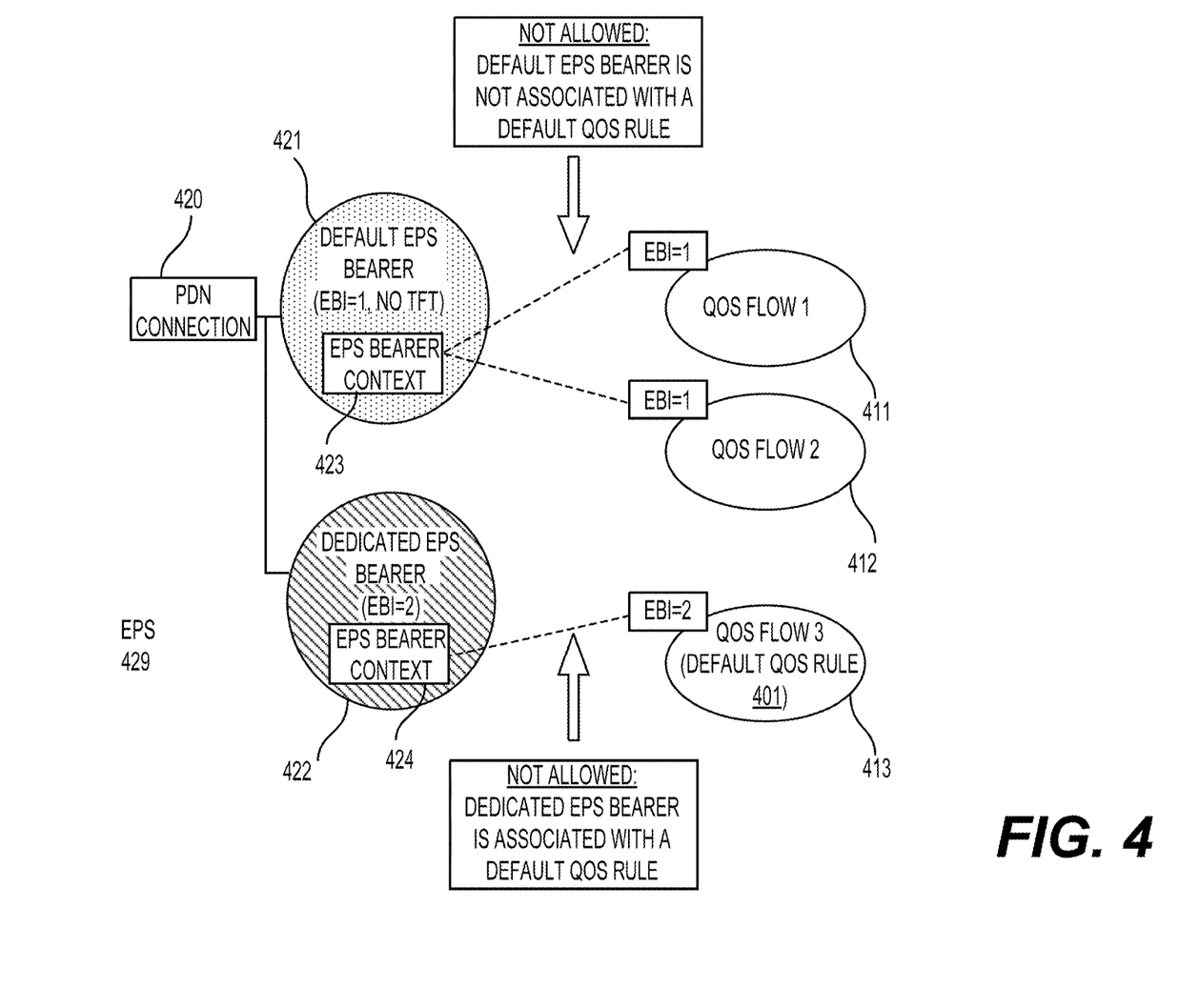
FIG. 4 shows an example of error checking and error handling operations over 5GS QoS flow parameters configured to a PDN connection 420 in an EPS 429.

FIG. 4 shows an example of error checking and error handling operations over 5GS QoS flow parameters configured to a PDN connection 420 in an EPS 429. The UE 101 is used as an example for explanation of the FIG. 4 example. Similar to the PDN connection 320 in FIG. 3A, the PDN connection 420 of the UE 101 can include a default EPS bearer 421 with EBI=1 and having no TFT configured, and a dedicated EPS bearer 422 with EBI=2. A first EPS bearer context 423 is associated with the default EPS bearer 421. The EPS bearer context 423 is associated with 5GS QoS flow parameters (e.g., QoS rule(s), and/or QoS flow description(s)) of non-default QoS flows 411-412. A second EPS bearer context 424 is associated with the dedicated EPS bearer 421. The EPS bearer context 423 is associated with 5GS QoS flow parameters (e.g., QoS rule(s), and/or QoS flow description(s)) of a default QoS flow 413 having a default QoS rule 401.

The EPS bearer contexts 423 and 424 can be established when the PDN 420 is established either as a result of an inter-system change of the UE 101 from N1 mode to S1 mode, or without any inter-system change (e.g., a session to a PDN is initially created). In order to properly match QoS flows to respective EPS bearers during an inter-system change, the EPS bearer contexts 423 and 424 can be modified when the PDN connection 420 is modified (e.g., triggered by the UE 101 or an EPC of the EPS 429, and following NAS messages received from the EPC).

When the EPS bearer contexts 423 and 424 are established or modified, 5GS QoS flow parameters (such as QoS rules and QoS flow descriptions) or modifications of respective 5GS QoS flow parameters can be provided from the EPC of the EPS 429 to the UE 101, for example, via NAS signaling (e.g., a PCO IE or an extended PCO IE). For example, the UE 101 may receive one or more NAS messages each carrying parameters of a QoS rule(s) and/or a QoS flow description(s) or indications of how to modify an existing QoS rule(s) and/or QoS flow description(s) (e.g., indicated by operation codes in the PCO IE or the extended PCO IE). Errors may take place with those received parameters or modifications.

As an example, in FIG. 2, the received PCO IE(s) may indicate to change EBI=1 of the QoS flow descriptions associated with the QoS flows 211-212 to EBI=2, while to chane EBI=2 of the QoS flow descriptions associated with QoS flow 213 to EBI=1. As a result, the default QoS rule 201 of the QoS flow 211 is changed to be associated with the dedicated EPS bearer context 224, while the default EPS bearer context 223 becomes having no associated default QoS rule. In various examples, various ways of modification or creation caused by the PCO IE or extended PCO IE may generate the error that a default EPS bearer has no default QoS rule associated.

Upon receiving those 5GS QoS flow parameters or indications, the UE 101 may start an error checking process to investigate whether there are errors with the provided 5GS QoS flow parameters. In an example, the UE 101 perform the error checking process before the received 5GS flow parameters are associated with the EPS bearer contexts 423-424 (including adding new parameters, and modifying existing parameters), while in another example, the UE 101 can perform the error checking process after the received 5GS flow parameters are associated with the EPS bearer contexts 423-424.

In other examples, the error checking process may not be performed following the reception of the 5GS QoS flow parameters. Instead, the error checking process may be held until an inter-system change from S1 mode to N1 mode (or from the EPS 429 to a 5GS) takes place. For example, in FIG. 1, a handover process may be triggered when the UE 101 moves from the eNB 131 towards the gNB 132. During the handover process, the eNB 131 may inform the UE 101 to switch a connection to the eNB 131 to a connection to the gNB 132. At this point, the UE 101 can detect that an inter-system change is taking place, and start the error checking process. In various examples, different events or time instances during an inter-system change may be used for triggering the UE 101 to start the error checking process. Before the trigger of the inter-system change, the UE 101 may have associated the received 5GS QoS flow parameters with the EPS bearer contexts 423-424 (including adding new parameters, and modifying existing parameters).

When performing the error checking process, in an example, the UE 101 may verify whether (1) the default EPS bearer context 423 is not associated with a default QoS rule, and/or (2) the dedicated EPS bearer context 424 is associated with the default QoS rule 401. Or, in other words, the UE 101 may verify whether (1) the default EPS bearer 421 is not associated with the default QoS rule, and/or (2) a dedicated EPS bearer 422 is associated with the default QoS rule 401. If the 5GS QoS flow parameters are received but has not been associated with the EPS bearer contexts 423-424, the verification may be conducted with assumption that the 5GS QoS flow parameters have been associated with the EPS bearer contexts 423-424. In the FIG. 4 example, the QoS flows 411-412 are non-default QoS flows without a default QoS rule being assigned. In addition, the QoS flow 413 is the default QoS flow (i.e., the QoS flow of the default QoS rule). Accordingly, the UE 101 can determine that both the conditions (1) and (2) are confirmed, and errors exist.

While only one dedicated EPS bearer 422 is shown in FIG. 4, there can be none or multiple dedicated EPS bearers in various examples. Thus, multiple dedicated EPS bearers can be checked against the condition (2). In addition, in various examples, the error checking can be performed to only one of the conditions (1) or (2), or can be performed with both the conditions (1) and (2) being verified.

In an example, upon starting of the error checking process, the UE 101 may first determine if the default EPS bearer context 423 or the dedicated EPS bearer context 424 is associated with one or more QoS flows after the association (or assumed assotiation) operation of the received 5GS QoS flow parameters. For example, the EPS bearer contexts 423-424 may not be associated with QoS rules for defining QoS flows. The UE 101 may determine that no QoS flows are associated with the EPS bearers 423-424. Under such circumstance, the UE 101 may skip the following error checking operations, and report an error to the EPC of the EPS 429.

After the errors are determined, the UE 101 may take actions to handle the errors. In an example, the UE 101 may report an error to the EPC of the EPS 429, for example, by transmitting an NAS message indicating an error cause. In an example, the UE 101 include a protocol configuration options (PCO) information element (TB) or extended PCO IE with a cause parameter set to 5G session management (SM) cause #83 "semantic error in the QoS operation" in a MODIFY EPS BEARER CONTEXT ACCEPT message.

If the received 5GS QoS flow parameters have not been associated with the respective EPS bearer contexts 423 or 424, in an example, the UE 101 can delete the received 5GS QoS flow parameters.

If the received 5GS QoS flow parameters have been associated with the respective EPS bearer contexts 423 or 424, the UE 101 may locally removing the 5GS QoS parameters (e.g., QoS rules or the QoS flow descriptions) associated with the respective EPS bearer contexts 423 or 424, and recover any removed or modified parameters. Or, the UE 101 may transmit a message requesting deletion of the received QoS rules or the QoS flow descriptions associated with the EPS bearer contexts 423 or 424.

In case the error checking process is triggered by an inter-system change from the EPS 429 to a 5GS, the UE 101 may release the PDN connection. Additionally, the UE 101 may skip the transfer of the PDN connection 420 from the EPS 429 to the 5GS. Or, in other examples, the UE 101 may continue to transfer the PDN connection 420 from the EPS 429 to the 5GS based on the available EPS bearer contexts 423-424 and associated 5G QoS parameters. Additionally, the UE 101 can still transmit an error report to the EPC of the EPS 429.

Figure 5:
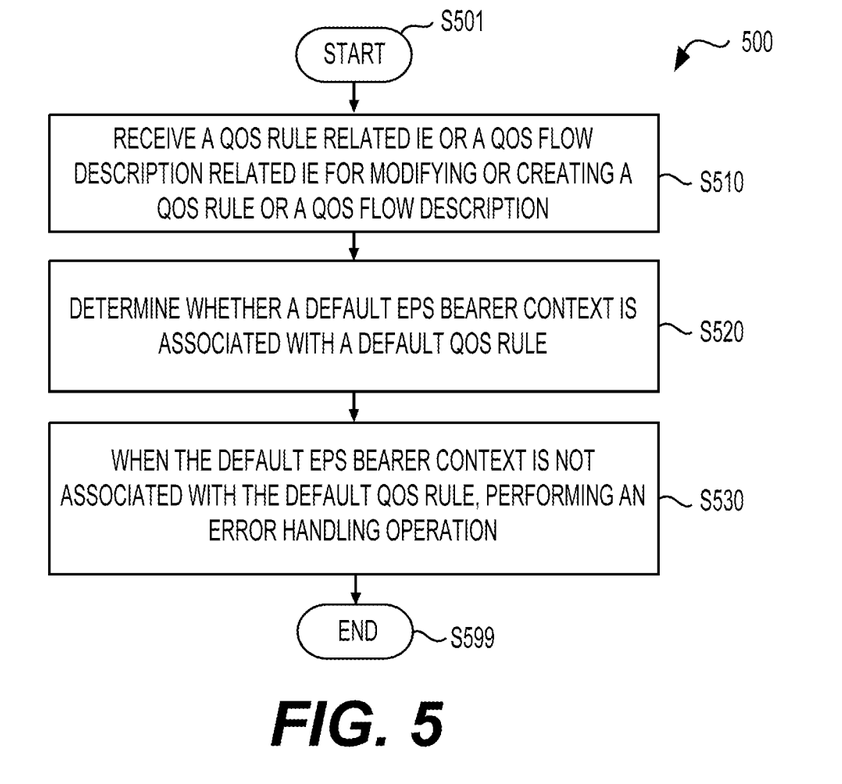
FIG. 5 shows an error checking process 500 according to an embodiment of the disclosure.

FIG. 5 shows an error checking process 500 according to an embodiment of the disclosure. The error checking process 500 can be performed to check errors in 5GS QoS flow parameters that are configured to a UE for preparation of an inter-system change from S1 mode to N1 mode. The UE 101 and the system 100 in FIG. 1 is used as an example for explanation of the process 500. The process 500 can start from S501, and proceed to S510.

At S510, a QoS rule related IE or a QoS flow description related IE carried in a NAS message for modifying or creating a QoS rule or a QoS flow description associated with an EPS bearer context (or an EPS bearer) of a PDN connection of the UE 101 can be received at the UE 101 from the EPC 110. Based on the received QoS rule related IE or the QoS flow description related IE, QoS rule(s) or QoS descriptions previously associated with the EPS bearer context can be modified, or a QoS rule or a QoS flow description indicated by the QoS rule related IE or the QoS flow related IE can be associated with the EPS bearer context.

For example, the QoS rule related IE or the QoS flow description related IE can be carried in a NAS message from the MME 111. In an example, the QoS rule related IE or the QoS flow description related IE can be a PCO IE or an extended PCO IE carried in a modify EPS bearer context request message. The QoS rule related IE may include one or more QoS rule parameters each corresponding to a QoS rule. Each such QoS rule parameter of the respective QoS rule in the IE may include QoS rule related parameters (e.g., a QoS rule ID, a QFI, a filter, precedence, and the like), and a rule operation code. The rule operation code can indicate how the respective QoS rule is to be modified or created based on the QoS rule related parameters provided. For example, the modification can include deleting an existing QoS rule (no QoS rule related parameters are provided in such a case), or modifying an existing QoS rule (e.g., changing filters, QFI, precedence, and the like). Similarly, the QoS flow description related IE may include one or more QoS flow description parameters each corresponding to a QoS flow. Each such QoS flow description parameter of the respective QoS flow in the IE may include QoS flow related parameters (e.g., a QFI, a parameter list, and the like), and a flow operation code. The flow operation code can indicate how an existing QoS flow description of the respective QoS flow are to be modified based on the QoS flow related parameters provided, or how a new QoS flow description can be created. Or, the flow operation code may indicate a QoS flow description is to be deleted, and no QoS flow related parameters are provided. Thus, when the QoS rule related IE or the QoS flow description related IE corresponding to a PDN connection of the UE 101 is received, the QoS parameters (of respective QoS rules or QoS flow descriptions) associated with the EPS bearer context (or the EPS bearer) of the PDN connection of the UE 101 can be modified or created.

The PDN connection includes a default EPS bearer, and optionally, a dedicated EPS bearer (or more than one dedicated EPS bearers). The default and dedicated EPS bearers may be associated with a default EPS bearer context and a dedicated EPS bearer context, respectively. The EPS bearer context corresponding to the to-be-modified (including to-be-created) QoS rules or the QoS flow descriptions (as indicated by the QoS rule IE or QoS flow description IE) can be the default EPS bearer or a dedicated EPS bearer The default and dedicated EPS bearer contexts may be newly established based on parameters configured from the EPC 110. Accordingly, the newly created QoS rules or the QoS flow descriptions (as indicated by the QoS rule IE or QoS flow description IE) can be associated with the respective default or dedicated EPS bearer context. Alternatively, the default and dedicated EPS bearer context are previously established (e.g., a result of an inter-system change, or newly created with no inter-system change), and the QoS rule IE or the QoS flow description IE can be used as a basis to modify the already existing QoS parameters (of respective QoS rules or QoS descriptions) associated with the default or dedicated EPS bearer context, or newly created QoS rules or descriptions (as indicated by the QoS IE or QoS flow description IE) can be associated with the default or dedicated EPS bearer context when no modification is performed.

At S520, it is determined that, when the QoS flow parameters associated with the default or dedicated EPS bearer contexts are created or modified according to the received QoS rule IE or the QoS description IE (the creation or modification may have occurred or may be assumed to have occurred), whether the default EPS bearer context of the PDN connection is associated with a default QoS rule. For example, the following two conditions may be verified both or individually: (1) the default EPS bearer context is not associated with the default QoS rule, or (2) a dedicated EPS bearer context is associated with the default QoS rule. Both of the above conditions (1) and (2) are disallowed. An error can be confirmed if the conditions (1) and/or (2) are confirmed.

In various examples, the above error checking operation at S520 can be performed once the QoS rule or the QoS flow description is received, or can be performed after detecting an inter-system change from S1 mode to N1 mode.

At S530, an error handling operation is performed when the error is detected in S520. For example, a NAS message indicating an error cause can be transmitted to the EPC 110. In addition, if the QoS rule or the QoS flow description is associated with the default or dedicated EPS bearer context, the UE 101 may delete the received QoS rule or the QoS flow description, and recover any removed or modified parameters. Or, the UE 101 may transmit a message requesting deletion of the received QoS rule or the QoS flow description associated with the respective EPS bearer context, and recovery of the removed or modified parameters.

In case the error checking is triggered by an inter-system change from S1 mode to N1 mode, the UE 101 may release the PDN connection, and skipping a transfer of the PDN connection from the EPS to the 5GS in FIG. 1. In other examples, the UE 101 may ignore the detected error, and continue to transfer the PDN connection from the EPS to the 5GS in FIG. 1. The process 500 may proceed to S599 and terminate at S599.

Figure 6:
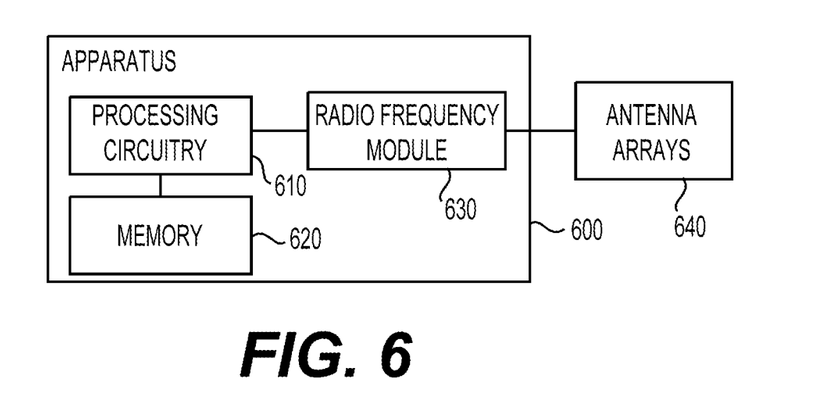
FIG. 6 shows an exemplary apparatus 600 according to embodiments of the disclosure.

FIG. 6 shows an exemplary apparatus 600 according to embodiments of the disclosure. The apparatus 600 can be configured to perform various functions in accordance with one or more embodiments or examples described herein. Thus, the apparatus 600 can provide means for implementation of mechanisms, techniques, processes, functions, components, systems described herein. For example, the apparatus 600 can be used to implement functions of UEs, BSs, and elements of core networks in various embodiments and examples described herein. The apparatus 600 can include a general purpose processor or specially designed circuits to implement various functions, components, or processes described herein in various embodiments. The apparatus 600 can include processing circuitry 610, a memory 620, and a radio frequency (RF) module 630.

In various examples, the processing circuitry 610 can include circuitry configured to perform the functions and processes described herein in combination with software or without software. In various examples, the processing circuitry 610 can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 610 can be a central processing unit (CPU) configured to execute program instructions to perform various functions and processes described herein. Accordingly, the memory 620 can be configured to store program instructions. The processing circuitry 610, when executing the program instructions, can perform the functions and processes. The memory 620 can further store other programs or data, such as operating systems, application programs, and the like. The memory 620 can include non-transitory storage media, such as a read only memory (ROM), a random access memory (RAM), a flash memory, a solid state memory, a hard disk drive, an optical disk drive, and the like.

In an embodiment, the RF module 630 receives a processed data signal from the processing circuitry 610 and converts the data signal to beamforming wireless signals that are then transmitted via antenna arrays 640, or vice versa. The RF module 630 can include a digital to analog converter (DAC), an analog to digital converter (ADC), a frequency up converter, a frequency down converter, filters and amplifiers for reception and transmission operations. The RF module 630 can include multi-antenna circuitry for beamforming operations. For example, the multi-antenna circuitry can include an uplink spatial filter circuit, and a downlink spatial filter circuit for shifting analog signal phases or scaling analog signal amplitudes. The antenna arrays 640 can include one or more antenna arrays.

The apparatus 600 can optionally include other components, such as input and output devices, additional or signal processing circuitry, and the like. Accordingly, the apparatus 600 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
   receiving at a user equipment (UE) a quality of service (QoS) rule related information element (IE) or a QoS flow description related IE, the QoS rule related IE including rule operation codes for modifying, deleting or creating a QoS rule associated with an evolved packet system (EPS) bearer context of a packet data network (PDN) connection, the QoS flow description related IE including operation codes for modifying, deleting, or creating a QoS flow description associated with the EPS bearer context of the PDN connection, the PDN connection having a default EPS bearer context and optionally a dedicated EPS bearer context;
   determining whether the default EPS bearer context of the PDN connection is associated with a default QoS rule; and
   when it is determined that the default EPS bearer context of the PDN connection is associated with one or more QoS flows but not associated with the default QoS rule, performing an error handling operation.

2. The method of claim 1, wherein the determining includes one of:
   determining the default EPS bearer context is not associated with the default QoS rule, Or
   determining the dedicated EPS bearer context is associated with the default QoS rule.

3. The method of claim 2, wherein the determining further includes:
   determining whether the default EPS bearer context or the dedicated EPS bearer context is associated with a QoS flow.

4. The method of claim 1, wherein the performing includes:
   transmitting a non-access stratum (NAS) message indicating an error cause.

5. The method of claim 1, wherein the performing includes one of:
   deleting the QoS rule associated with the EPS bearer context, or
   transmitting a message requesting deletion of the QoS rule associated with the EPS bearer context.

6. The method of claim 1, wherein the determining includes:
   in response to receiving the QoS rule related IE or the QoS flow description related IE, determining whether the default EPS bearer context of the PDN connection is associated with the default QoS rule.

7. The method of claim 1, wherein the determining includes:
   in response to detecting that an inter-system change from an EPS to a fifth generation system (5GS) takes place, determining whether the default EPS bearer context of the PDN connection is associated with the default QoS rule.

8. The method of claim 7, wherein the performing includes one of:
   releasing the PDN connection,
   skipping a transfer of the PDN connection from the EPS to the 5GS, or
   transferring the PDN connection from the EPS to the 5GS.

9. An apparatus, comprising circuitry configured to:
   receive a quality of service (QoS) rule related information element (IE) or a QoS flow description related IE, the QoS rule related IE including rule operation codes for modifying, deleting, or creating a QoS rule associated with an evolved packet system (EPS) bearer context of a packet data network (PDN) connection, the QoS flow description related IE including operation codes for modifying, deleting, or creating a QoS flow description associated with the EPS bearer context of the PDN connection, the PDN connection having a default EPS bearer context and optionally a dedicated EPS bearer context;

determine whether the default EPS bearer context of the PDN connection is associated with a default QoS rule; and when it is determined that the default EPS bearer context of the PDN connection is associated with one or more QoS flows but not associated with the default QoS rule, perform an error handling operation.

10. The apparatus of claim 9, wherein the circuitry is further configured to:
   determine the default EPS bearer context is not associated with the default QoS rule, or
   determine the dedicated EPS bearer context is associated with the default QoS rule.

11. The apparatus of claim 9, wherein the circuitry is further configured to:
   transmit a non-access stratum (NAS) message indicating an error cause.

12. The apparatus of claim 9, wherein the circuitry is further configured to:
   delete the QoS rule associated with the EPS bearer context, or
   transmit a message requesting deletion of the QoS rule associated with the EPS bearer context.

13. The apparatus of claim 9, wherein the circuitry is further configured to:
   in response to receiving the QoS rule related IE or the QoS flow description related IE, determine whether the default EPS bearer context of the PDN connection is associated with the default QoS rule.

14. The apparatus of claim 9, wherein the circuitry is further configured to:
   release the PDN connection,
   skip a transfer of the PDN connection from an EPS to a fifth generation system (5GS), or
   transfer the PDN connection from the EPS to the 5GS.

15. A non-transitory computer-readable medium storing instructions that, when executed by a processor, cause the processor to perform a method, the method comprising:
   receiving at a user equipment (UE) a quality of service (QoS) rule related information element (IE) or a QoS flow description related IE, the QoS rule related IE including rule operation codes for modifying, deleting, or creating a QoS rule associated with an evolved packet system (EPS) bearer context of a packet data network (PDN) connection, the QoS flow description related IE including operation codes for modifying or creating a QoS flow description associated with the EPS bearer context of the PDN connection, the PDN connection having a default EPS bearer context and optionally a dedicated EPS bearer context;
   determining whether the default EPS bearer context of the PDN connection is associated with a default QoS rule; and
   when it is determined that the default EPS bearer context of the PDN connection is associated with one or more QoS flows but not associated with the default QoS rule, performing an error handling operation.

16. The non-transitory computer-readable medium of claim 15, wherein the determining includes one of:
   determining the default EPS bearer context is not associated with the default QoS rule, or
   determining the dedicated EPS bearer context is associated with a default QoS rule.

17. The non-transitory computer-readable medium of claim 15, wherein the performing includes:
   transmitting a non-access stratum (NAS) message indicating an error cause.

18. The non-transitory computer-readable medium of claim 15, wherein the performing includes one of:
   deleting the QoS rule associated with the EPS bearer context, or
   transmitting a message requesting deletion of the QoS rule associated with the EPS bearer context.

19. The non-transitory computer-readable medium of claim 15, wherein the determining includes:
   in response to receiving the QoS rule related IE or the QoS flow description related IE, determining whether the default EPS bearer context of the PDN connection is associated with the default QoS rule.

20. The non-transitory computer-readable medium of claim 15, wherein the performing includes one of:
   releasing the PDN connection,
   skipping a transfer of the PDN connection from an EPS to a fifth generation system (5GS), or
   transferring the PDN connection from the EPS to the 5GS.

* * * * *